United States Patent
David et al.

(10) Patent No.: US 10,740,492 B2
(45) Date of Patent: Aug. 11, 2020

(54) DATA ENRICHMENT ENVIRONMENT USING BLOCKCHAIN

(71) Applicant: American Express Travel Related Services Company, Inc., New York, NY (US)

(72) Inventors: Vincent Julien David, Port Washington, NY (US); Yogaraj Jayaprakasam, Phoenix, AZ (US); Daniel Reznik, Staten Island, NY (US); Hemant Bhatia, Naperville, IL (US); Travis Brown, New York, NY (US); Ashwin Nagalla, Brooklyn, NY (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 213 days.

(21) Appl. No.: 15/951,010

(22) Filed: Apr. 11, 2018

(65) Prior Publication Data
US 2019/0318129 A1    Oct. 17, 2019

(51) Int. Cl.
| | |
|---|---|
| G06F 21/64 | (2013.01) |
| H04L 9/06 | (2006.01) |
| H04L 29/08 | (2006.01) |
| G06F 16/27 | (2019.01) |
| G06F 16/25 | (2019.01) |
| G06F 16/18 | (2019.01) |

(52) U.S. Cl.
CPC ........ *G06F 21/645* (2013.01); *G06F 16/1805* (2019.01); *G06F 16/252* (2019.01); *G06F 16/27* (2019.01); *H04L 9/0637* (2013.01); *H04L 67/104* (2013.01)

(58) Field of Classification Search
None
See application file for complete search history.

(56) References Cited

U.S. PATENT DOCUMENTS

| | | | |
|---|---|---|---|
| 2015/0161664 A1 | 6/2015 | Koppelmann | |
| 2016/0335533 A1* | 11/2016 | Davis | G06F 9/44 |
| 2017/0232300 A1* | 8/2017 | Tran | H04L 67/12 |
| | | | 434/247 |

(Continued)

OTHER PUBLICATIONS

Vincent Julien David, et al., U.S. Appl. No. 15/810,866, filed Nov. 13, 2017, titled "Evaluating Colliding Data Records," 44 pages.

(Continued)

*Primary Examiner* — Fatoumata Traore
(74) *Attorney, Agent, or Firm* — Thomas | Horstemeyer, LLP

(57) ABSTRACT

A data enrichment environment using blockchain is disclosed. A client may interact with the data enrichment environment to generate an enrichment smart contract and deploy the enrichment smart contract to the blockchain. The enrichment smart contract may comprise data indicating the enrichment inquiry. One or more solvers may interact with the data enrichment environment to submit proposed enrichment solutions based on the enrichment inquiry. One or more observers may interact with the data enrichment environment to review and vote on the proposed enrichment solutions. The data enrichment environment may evaluate the proposed enrichment solutions based on contract conditions.

20 Claims, 4 Drawing Sheets

(56) References Cited

U.S. PATENT DOCUMENTS

2017/0236094 A1    8/2017  Shah
2017/0372308 A1*  12/2017  Metnick ................ G06Q 20/10

OTHER PUBLICATIONS

Vincent Julien David, et al., U.S. Appl. No. 15/810,917, filed Nov. 13, 2017, titled "Detecting and Updating Duplicate Data Records," 47 pages.
International Search Report and Written Opinion dated Jun. 26, 2019 in PCT Application PCT/US19/26812.

* cited by examiner

DATA ENRICHMENT ENVIRONMENT USING BLOCKCHAIN

FIELD

This disclosure generally relates to systems for enriching data, and more particularly, to systems and methods for data enrichment using crowdsourcing enabled through a distributed database.

BACKGROUND

Users and entities may desire to enrich known data to enhance, refine, and/or otherwise improve the known data. For example, business entity resolution is a challenge facing organizations that handle relationships with a large number of businesses, merchants, or the like. Business information that is received may be incomplete, and thus, businesses may be hard to identify. Moreover, additional business information (e.g., pictures, user reviews, etc.) to enhance known business information may be desired. Additional business information may often be purchased to complete or enhance the known business data.

SUMMARY

A system, method, and computer readable medium (collectively, the "system") is disclosed for a data enrichment environment using blockchain. The system may generate an enrichment smart contract comprising a client ID, an inquiry ID, a first vendor detail, an enrichment request detail, and a contract condition. The system may deploy the enrichment smart contract to the blockchain. The system may receive a proposed enrichment solution comprising a solver ID, a solution ID, the inquiry ID, a second vendor detail, and an enrichment solution detail corresponding to the enrichment request detail. The system may evaluate the proposed enrichment solution based on the contract condition, the first vendor detail, and the second vendor detail, wherein in response to the proposed enrichment solution passing the evaluation, a validated enrichment solution is generated.

In various embodiments, the system may receive an enrichment solution validation vote corresponding to the proposed enrichment solution, the enrichment solution validation vote comprising an observer ID, the solution ID, the inquiry ID, and a vote. The proposed enrichment solution may further be validated based on the vote.

In various embodiments, the system may receive an enrichment inquiry comprising a third vendor detail and a request detail. The system may query the blockchain to determine whether the third vendor detail and the request detail preexists. In response to determining that the third vendor detail and the request detail preexists, a request solution may be generated comprising the preexisting data. In response to determining that the third vendor detail and the request detail do not preexist, a second enrichment contract may be generated comprising the third vendor detail and the request detail.

In various embodiments, the enrichment smart contract may also comprise a total reward amount and a reward distribution schema. The total reward amount may be disbursed to at least one of the solver ID or the observer ID based on the reward distribution schema.

In various embodiments, the system may update solver reputation data based on the evaluation of the proposed enrichment solution. The solver reputation data may correspond to the solver ID and may comprise at least one of a total count of solutions proposed, a count of positive solutions, a count of validated solutions, a count of negative solutions, or a count of failed solutions. The system may update observer reputation data based on the evaluation of the proposed enrichment solution. The observer reputation data may correspond to the observer ID and may comprise at least one of a total count voted on, a count of positive votes, a count of positive votes agreeing with the majority, a count of negative votes, or a count of negative votes agreeing with the majority.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

Figure 1:
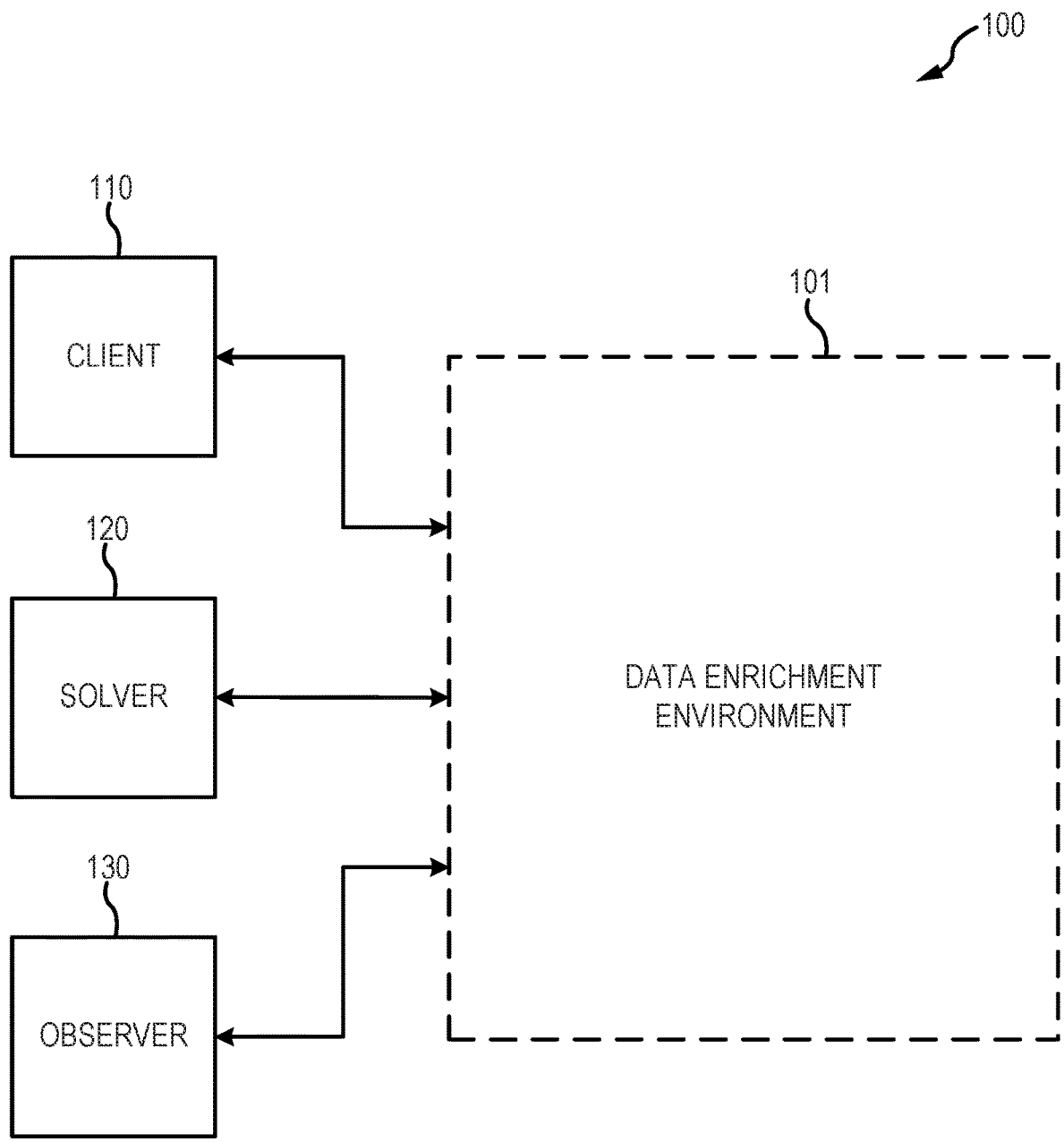
FIG. 1 is a block diagram illustrating various system components of a system for enriching data, in accordance with various embodiments.

The detailed description of various embodiments refers to the accompanying drawings, which show various embodiments by way of illustration. While these various embodiments are described in sufficient detail to enable those skilled in the art to practice the disclosure, it should be understood that other embodiments may be realized and that logical and physical changes may be made without departing from the spirit and scope of the disclosure. Thus, the detailed description is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

A data enrichment environment implementing a distributed database may be used to process data enrichment inquiries and requests, and to provide validated solutions and responses. The data enrichment environment may comprise a marketplace or crowdsource-based system, wherein various users can interact to submit inquiries, to submit proposed solutions, and/or to vote on the proposed solutions of others. For example, users (e.g., "clients") may submit data enrichment inquiries to the environment. The inquiries may comprise any type of data enrichment request, such as requests for data quality improvement (e.g., verify a merchant name, address, etc.), a picture, a location, a rating, a review, or the like). For example, the data enrichment environment may be used to aid in business entity resolution in data gathering and analysis.

Business entity information may be incomplete and businesses may be hard to identify. Therefore, additional business information (e.g., pictures, user reviews, etc.) to enhance known business information may be desired. Users (e.g., "solvers") can access the data enrichment environment to review the data enrichment inquiries and submit a proposed solution to an inquiry. Users (e.g., "observers") may access the data enrichment environment to review the proposed solutions and validate that the proposed solution is correct. Any of the types of "users" discussed herein may perform any of the functions described herein. Although the present disclosure may make reference to enriching business information, it should be understood that principles of the present disclosure may apply to any suitable data enrichment need, such as, for example, product information enrichment, map data enrichment, transaction account data enrichment, animal species database management and/or enrichment, and/or any other desired type of data. Although the present disclosure may make reference to a "merchant," "business," or the like, it should be understood that principles of the present disclosure may be used by any suitable or desired party, such as, for example, organizations, companies, individuals, or any other entity desiring enrichment of data.

The systems, methods, and computer readable mediums (collectively, the "system") described herein, in accordance with various embodiments, may use a distributed ledger maintained by a plurality of computing devices (e.g., nodes) over a peer-to-peer network. Each computing device maintains a copy and/or partial copy of the distributed ledger and communicates with one or more other computing devices in the network to validate and write data to the distributed ledger. The distributed ledger may use features and functionality of blockchain technology, including, for example, consensus based validation, immutability, and cryptographically chained blocks of data. The blockchain may comprise a ledger of interconnected blocks containing data. The blockchain may provide enhanced security because each block may hold individual transactions and the results of any blockchain executables. Each block may link to the previous block and may include a timestamp. Blocks may be linked because each block may include the hash of the prior block in the blockchain. The linked blocks form a chain, with only one successor block allowed to link to one other predecessor block for a single chain. Forks may be possible where divergent chains are established from a previously uniform blockchain, though typically only one of the divergent chains will be maintained as the consensus chain. In various embodiments, the blockchain may implement smart contracts that enforce data workflows in a decentralized manner. The system may also include applications deployed on user devices such as, for example, computers, tablets, smartphones, Internet of Things devices ("IoT" devices), etc. The applications may communicate with the blockchain (e.g., directly or via a blockchain node) to transmit and retrieve data. In various embodiments, a governing organization or consortium may control access to data stored on the blockchain. Registration with the managing organization(s) may enable participation in the blockchain network.

The system may integrate smart contracts that enforce data enrichment inquiries and/or data enrichment workflows in a decentralized manner. Data enrichment performed through the blockchain-based system may propagate to the connected peers within the blockchain network within a duration that may be determined by the block creation time of the specific blockchain technology implemented. For example, on an ETHEREUM®-based network, a new data entry may become available within about 13-20 seconds as of the writing. On a Hyperledger® Fabric 1.0 based platform, the duration is driven by the specific consensus algorithm that is chosen, and may be performed within seconds. In that respect, propagation times in the system may be improved compared to existing systems, and implementation costs and time to market may also be drastically reduced. The system also offers increased security at least partially due to the immutable nature of data that is stored in the blockchain, reducing the probability of tampering with various data inputs and outputs. Moreover, the system may also offer increased security of data by performing cryptographic processes on the data prior to storing the data on the blockchain. Therefore, by transmitting, storing, and accessing data using the system described herein, the security of the data is improved, which decreases the risk of the computer or network from being compromised.

In various embodiments, the system may also reduce database synchronization errors by providing a common data structure, thus at least partially improving the integrity of stored data. The system also offers increased reliability and fault tolerance over traditional databases (e.g., relational databases, distributed databases, etc.) as each node operates with a full copy of the stored data, thus at least partially reducing downtime due to localized network outages and hardware failures. The system may also increase the reliability of data transfers in a network environment having reliable and unreliable peers, as each node broadcasts messages to all connected peers, and, as each block comprises a link to a previous block, a node may quickly detect a missing block and propagate a request for the missing block to the other nodes in the blockchain network. For more information on distributed ledgers implementing features and functionalities of blockchain, see U.S. application Ser. No. 15/266,350 titled SYSTEMS AND METHODS FOR BLOCKCHAIN BASED PAYMENT NETWORKS and filed on Sep. 15, 2016, U.S. application Ser. No. 15/682,180 titled SYSTEMS AND METHODS FOR DATA FILE TRANSFER BALANCING AND CONTROL ON BLOCKCHAIN and filed Aug. 21, 2017, U.S. application Ser. No. 15/728,086 titled SYSTEMS AND METHODS FOR LOYALTY POINT DISTRIBUTION and filed Oct. 9, 2017, U.S. application Ser. No. 15/785,843 titled MESSAGING BALANCING AND CONTROL ON BLOCKCHAIN and filed on Oct. 17, 2017, U.S. application Ser. No. 15/785,870 titled API REQUEST AND RESPONSE BALANCING AND CONTROL ON BLOCKCHAIN and filed on Oct. 17, 2017, U.S. application Ser. No. 15/824,450 titled SINGLE SIGN-ON SOLUTION USING BLOCKCHAIN and filed on Nov. 28, 2017, and U.S. application Ser. No. 15/824,513 titled TRANSACTION AUTHORIZATION PROCESS USING BLOCKCHAIN and filed on Nov. 28, 2017, the contents of which are each incorporated by reference in its entirety.

In various embodiments, enriching data using the systems and processes described herein may further speed processing in the computer based system, and reduce the computational and storage needs typically required by data processing and enriching environments. For example, after data is enriched in the system, future users may access and benefit from the existing enriched data without needing to resubmit data enrichment inquiries or separately enrich or validate the data. Thus, the user performs less computer functions and provides less input, which saves on data storage and memory which speeds processing. The decentralized common database also enables users to benefit from each other's effort and minimize total cost of managing information across industries. Reputation data may be used to further ensure that the enriched data is accurate, and to allow users to further benefit from accurate and trusted data.

As used herein, "electronic communication" means communication of at least a portion of the electronic signals with physical coupling (e.g., "electrical communication" or "electrically coupled") and/or without physical coupling and via an electromagnetic field (e.g., "inductive communication" or "inductively coupled" or "inductive coupling"). As used herein, "transmit" may include sending at least a portion of the electronic data from one system component to another (e.g., over a network connection). Additionally, as used herein, "data," "information," or the like may include encompassing information such as commands, queries, files, data for storage, and the like in digital or any other form.

With reference to FIG. 1, a system 100 for enriching data is disclosed and may be used with various embodiments. System 100 may include various computing devices, software modules, networks, and data structures in communication with one another. System 100 may also contemplate uses in association with web services, utility computing, pervasive and individualized computing, security and identity solutions, autonomic computing, cloud computing, commodity computing, mobility and wireless solutions, open source, grid computing and/or mesh computing.

System 100 may be based on a blockchain, and may simplify data enrichment operations by using the blockchain as a distributed and tamper-proof data store. The system may also simplify data enrichment operations by providing a simplified system architecture. Transparency is very high for various embodiments using a consortium or public blockchain since validation is performed, for example, using data stored by a decentralized autonomous organization (DAO) instead of a specific financial institution.

In various embodiments, system 100 may comprise one or more of a data enrichment environment 101, a client 110, a solver 120, and/or an observer 130. The various systems and components described herein may be in direct logical communication with each other via a bus, network, and/or through any other suitable means, or may be individually connected as described further herein.

Figure 2:
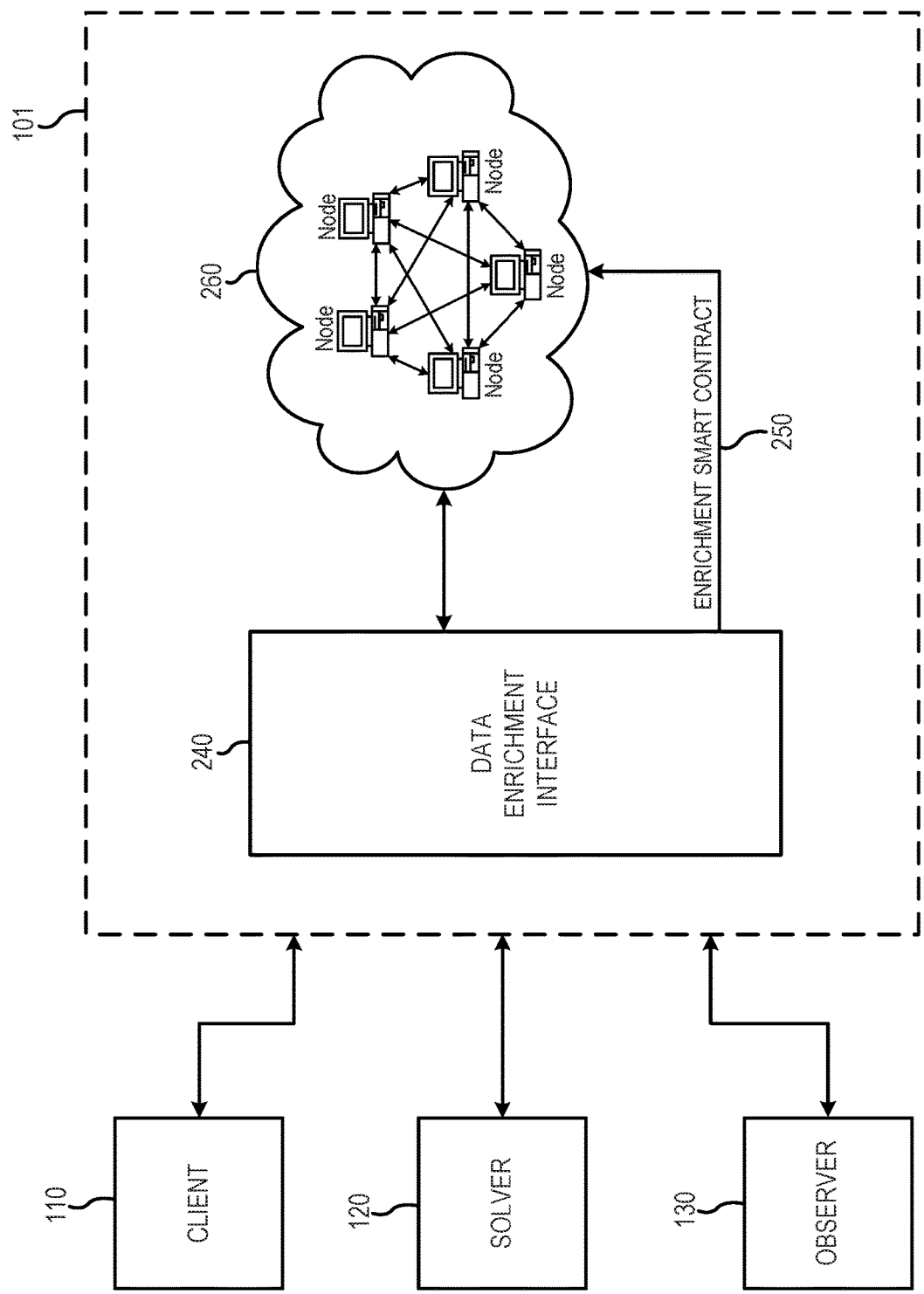
FIG. 2 is a block diagram illustrating an exemplary data enrichment environment for a system for enriching data, in accordance with various embodiments.

In various embodiments, each of client 110, solver 120, and observer 130 may comprise physically distinct components and/or systems. In various embodiments, client 110, solver 120, and/or observer 130 may comprise logical variations of a single system. For example, and as discussed further herein, a single system or network may be used to submit enrichment inquiries, submit proposed enrichment solutions to inquiries of other systems or networks, and/or vote on and validate proposed enrichment solutions of other systems or networks. In various embodiments, one or more of client 110, solver 120, observer 130, and/or a third-party user or system may also comprise a mining "rig" or system configured to act as a blockchain miner for a blockchain (e.g., blockchain 260, with brief reference to FIG. 2). Blockchain mining may refer to the process of cryptographically adding records (e.g., a "blocks") to the blockchain.

In various embodiments, client 110, solver 120, and observer 130 may be in electronic and/or logical communication with data enrichment environment 101. Client 110, solver 120, and/or observer 130 may include at least one computing device in the form of a computer or processor, or a set of computers/processors, although other types of computing units or systems may be used, such as, for example, a server, web server, pooled servers, or the like. In various embodiments, client 110, solver 120, and/or observer 130 may each comprise any suitable combination of hardware and/or software and may be a computing device such as a server, laptop, notebook, hand held computer, personal digital assistant, cellular phone, smart phone (e.g., iPhone®, BlackBerry®, Android®, etc.) tablet, wearable (e.g., smart watches, smart glasses, smart rings, etc.), Internet of things (IoT) device, smart speaker, or any other device capable of interacting with data enrichment environment 101.

In various embodiments, client 110 may be configured to transmit enrichment inquiries to data enrichment environment 101. The enrichment inquiries may comprise any type of data enrichment request, such as requests for data quality improvement (e.g., verify a business name, address, etc.), a picture, a location, a rating, a review, or the like). For example, the enrichment inquiry may comprise vendor details (e.g., business name, address, location, URL, image URL, etc.), request details (e.g., enrichment request, expiration date, etc.), reward details (e.g., a total reward amount, a reward distribution schema, contract conditions, etc.), and/or the like. The total reward amount may comprise a total value to be disbursed in response to a solution being found. In various embodiments, funds matching the total reward amount may be transmitted with the enrichment inquiry. The reward distribution schema may comprise data indicating how the total reward amount is to be paid out in response to the solution being found (e.g., 70% to solver 120 that transmitted the solution; 30% split between each observer 130 that correctly voted for the solution; and/or the like). The contract conditions may comprise details regarding the solution (e.g., only solutions from solvers 120 having a solver reputation of "positive" are accepted, or the like) and voting requirements (e.g., first proposed solution to 50 "yes" votes is selected as the solution; a proposed solution having 90% of the votes as "yes" is selected as the solution; only votes from observers 130 having an observer reputation of "positive" are accepted; and/or the like). While the functions of the client 110, solver 120, and observer 130 may be described separately herein, such functions may be performed by any of the client 110, solver 120, and/or observer 130 at any time.

In various embodiments, solver 120 may be configured to interface with data enrichment environment 101 to view enrichment inquiries and transmit proposed enrichment solutions corresponding to an enrichment inquiry, as discussed further herein. For example, wherein the enrichment inquiry is a request for a photograph of a merchant's location, the proposed enrichment solution may comprise a photograph of the merchant's location, a URL link to a photograph of the merchant's location, or the like. Wherein the enrichment inquiry comprises data asking to verify a vendor detail (e.g., verify a business's address), the proposed enrichment solution may comprise data verifying the vendor detail or data indicating that the vendor detail as inquired is incorrect. The proposed enrichment solution may comprise a solver ID (e.g., the blockchain address of solver 120), vendor details (e.g., business name, address, location, URL, image URL, etc.), solution details (e.g., the inquiry ID, the proposed solution corresponding to the enrichment request in the enrichment smart contract 250, etc.), and a solution ID. The solution ID may comprise a randomly generated number assigned to each proposed enrichment solution.

In various embodiments, observer 130 may be configured to interface with data enrichment environment 101 to view proposed enrichment solutions and to transmit enrichment solution validation votes corresponding to each proposed enrichment solution. For example, the enrichment solution validation vote may comprise data (e.g., the vote) indicating a "yes" or "no" value, and/or any other suitable identifier. The enrichment solution validation vote may comprise the vote, an observer ID (e.g., the blockchain address of observer 130), the solution ID, and/or the like.

Data enrichment environment 101 may be configured to process and provide solutions to data enrichment inquiries. In various embodiments, and with reference to FIG. 2, an exemplary data enrichment environment 101 is disclosed in greater detail. Data enrichment environment 101 may comprise a data enrichment interface 240 and a blockchain 260. Each of client 110, solver 120, and/or observer 130 may run applications to interact with the blockchain 260, transfer files over a network with other computing devices, perform crypto operations, and otherwise operate within system 100. A blockchain address may be uniquely assigned to each client 110, solver 120, and/or observer 130 to function as a unique identifier for each respective client 110, solver 120, and/or observer 130. In various embodiments, data enrichment environment 101 may use a Hierarchical Deterministic (HD) solution and may use BIP32, BIP39, and/or BIP44, for example, to generate an HD tree of public addresses.

Blockchain 260 may be a distributed database that maintains records in a readable manner and that is resistant to tampering. Blockchain 260 may be based on blockchain technologies such as, for example, Ethereum, Open Chain, Chain Open Standard, Hyperledger Fabric, and/or any other suitable technology leveraging smart contracts. Blockchain 260 may comprise a system of interconnected blocks containing data. The blocks can hold enrichment inquiries, proposed enrichment solutions, validated enrichment solutions, solver reputation data, observer reputation data, and/or other information as desired. Each block may link to the previous block and may include a timestamp. When implemented in support of system 100, blockchain 260 may serve as an immutable log for data enrichment inquiries. Blockchain 260 may be a peer-to-peer network that is private, consortium and/or public in nature (e.g., Ethereum, Hyperledger Fabric, etc.). Consortium and private networks may offer improved control over the content of blockchain 260 and public networks may leverage the cumulative computing power of the network to improve security. In that regard, blockchain 260 may be implemented using technologies such as, for example, Ethereum GETH, eth-lightwallet, or other suitable blockchain interface technologies.

Blockchain 260 may be maintained on various blockchain nodes in the form of copies of the blockchain. Data regarding enrichment inquiries or reputation may be added to blockchain 260 by establishing consensus between the blockchain nodes based on proof of work, proof of stake, practical byzantine fault tolerance, delegated proof of stake, or other suitable consensus algorithms. In various embodiments, client 110, solver 120, and/or observer 130 may each comprise a blockchain node maintaining copies of blockchain 260 and validating new writes to blockchain 260. Client 110, solver 120, and/or observer 130 may interface with applications and computing devices, including data enrichment environment 101 via data enrichment interface 240, as discussed further herein. Client 110, solver 120, and/or observer 130 may also be configured to add data to blockchain 260 in response to receiving instructions from data enrichment interface 240, receiving input from a user, and/or the like.

The various electronic communications of system 100 including transmitting enrichment inquiries, proposed enrichment solutions, enrichment solution validation votes, and validated enrichment solutions, writing various blocks to blockchain 260, and/or reading data from blockchain 260 may be accomplished using a network. As used herein, the term "network" includes any cloud, cloud computing system or electronic communications system or method that incorporates hardware and/or software components. Communication among the parties may be accomplished through any suitable communication channels, such as, for example, a telephone network, an extranet, an intranet, Internet, point of interaction device (point of sale device, personal digital assistant, cellular phone, kiosk, tablet, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, AppleTalk, IP-6, NetBIOS, OSI, any tunneling protocol (e.g., IPsec, SSH, etc.), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

A network may be unsecure. Thus, communication over the network may utilize data encryption. Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptosystems. Asymmetric encryption in particular may be of use in signing and verifying signatures for blockchain crypto operations.

In various embodiments, data enrichment interface 240 may be configured receive and transmit data, as discussed further herein. Data enrichment interface 240 may be in electronic and/or logical communication with blockchain 260. Data enrichment interface 240 may be configured as an interface for client 110, solver 120, and/or observer 130 to transmit and receive data from blockchain 260. For example, data enrichment interface 240 may comprise an application programming interface (API) configured to allow client 110, solver 120, and/or observer 130 to interface with blockchain 260. In that respect, data enrichment interface 240 may comprise a web3 API compatible with the blockchain maintained by the Ethereum® consortium, and/or any other suitable API or interface. Data enrichment interface 240 may also comprise any suitable combination of software and/or hardware, and may include a processor configured to perform operations in response to receiving instructions.

Figure 3:
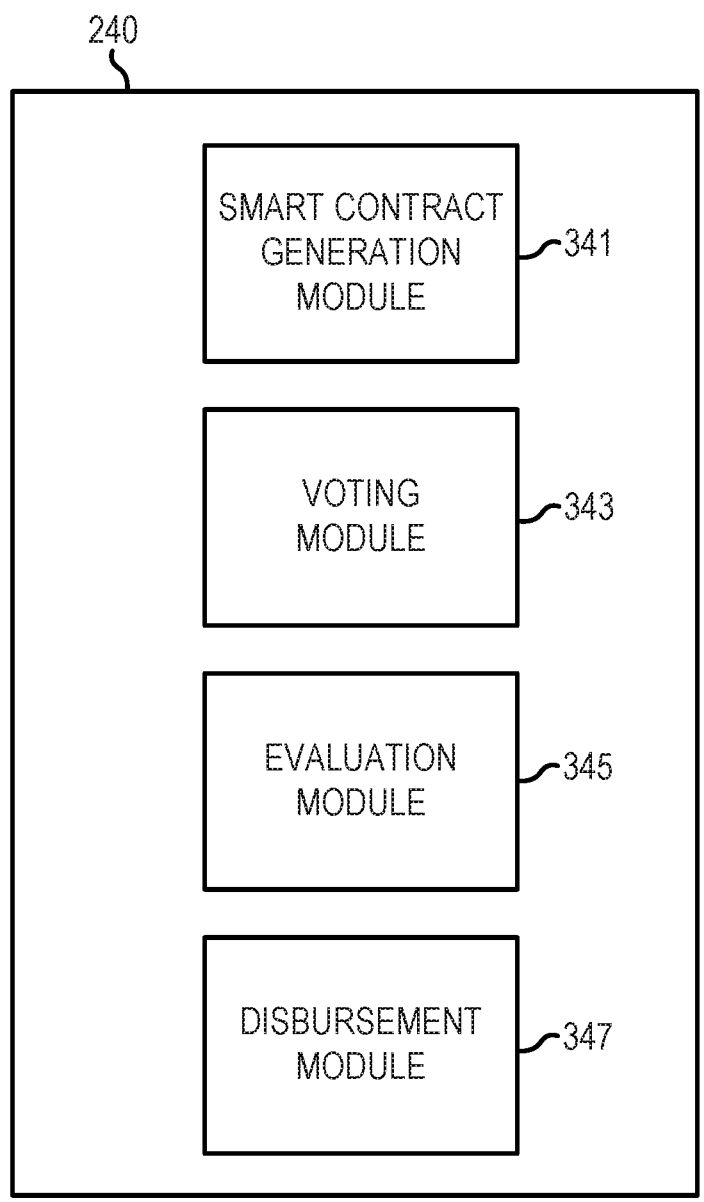
FIG. 3 is a block diagram illustrating various system components for an exemplary data enrichment interface in a data enrichment environment, in accordance with various embodiments.

For example, and as discussed further herein, data enrichment interface 240 may be configured to receive an enrichment inquiry via client 110, query blockchain 260 based on the enrichment inquiry, generate an enrichment smart contract 250 based on the enrichment inquiry, and deploy the enrichment smart contract 250 to blockchain 260; receive a proposed enrichment solution via solver 120 and deploy the proposed enrichment solution to blockchain 260; receive an enrichment solution validation vote; and evaluate the proposed enrichment solution based on the enrichment inquiry and the enrichment solution validation vote. In various embodiments, data enrichment interface 240 may comprise one or more systems, components, modules, data structures, or the like configured to aide in processing data inputs and outputs. For example, in accordance with various embodiments and with reference to FIG. 3, an exemplary data enrichment interface 240 is disclosed in greater detail. Data enrichment interface 240 may comprise a smart contract generation module 341, a voting module 343, an evaluation module 345, and/or a disbursement module 347. Each module may comprise one or more software, hardware, and/or database components, and may be physically and/or logically distinct.

Smart contract generation module 341 may be configured to receive the enrichment inquiry from client 110, query blockchain 260 based on the enrichment inquiry, generate the enrichment smart contract 250, and/or deploy the enrichment smart contract 250 to blockchain 260, as discussed further herein. The enrichment smart contract 250 may be configured to control the data enrichment workflow for the enrichment inquiry. The enrichment smart contract 250 may comprise a client ID (e.g., the blockchain address of client 110), the enrichment inquiry, and/or an inquiry ID. The inquiry ID may comprise a randomly generated number assigned to each enrichment smart contract 250. The enrichment smart contract 250 may be completed by digital signature using asymmetric crypto operations and a private key (e.g., the private key assigned to client 110, solver 120, and/or observer 130), for example. Smart contract generation module 341 may deploy the enrichment smart contract 250 to blockchain 260.

Voting module 343 may be configured to receive enrichment solution validation votes from observer 130 and/or deploy the enrichment solution validation votes to blockchain 260. The enrichment solution validation vote may be digitally signed by the private key of observer 130 prior to being deployed to blockchain 260.

Evaluation module 345 may be configured to evaluate proposed enrichment solutions and/or generate a validated enrichment solution in response to determining that the proposed enrichment solution is correct. Evaluation module 345 may evaluate each proposed enrichment solution based on the contract conditions specified in the enrichment inquiry and the enrichment solution validation votes. For example, the contract conditions may specify that a desired number of positive enrichment solution validation votes are received, that each observer voting on the solution have a minimum observer reputation (e.g., 60% positive), that the solver originating the solution have a minimum solver reputation (e.g., 70% positive), and/or any other suitable limitation. As a further example, the contract conditions may specify that only one or two positive enrichment solution validation votes are needed when the enrichment requests relates to a picture, but an additional number of positive enrichment solution validation votes may be required for enrichment requests for merchant ratings, merchant reviews, or the like. In response to determining that a proposed enrichment solution is correct, evaluation module 345 may generate a validated enrichment solution and transmit the validated enrichment solution to client 110. In various embodiments, evaluation module 345 may also write the validated enrichment solution to blockchain 260.

In various embodiments, in response to evaluation module 345 determining that two or more proposed enrichment solutions are both correct, evaluation module 345 may be configured to select a proposed enrichment solution as the validated enrichment solution using any suitable technique. For example, the contract conditions may specify tiebreaking rules, such as, for example, tiebreaking based on a timestamp, an average reputation of the observers, an average reputation of the solvers, and/or the like.

Disbursement module 347 may be configured to disburse enrichment rewards in response to the validated enrichment solution being transmitted to client 110 (e.g., in response to solving an enrichment inquiry). For example, disbursement module 347 may be configured to disburse the total reward amount based on the contract conditions specified in the enrichment inquiry. For example, the contract conditions may specify the portions of the total reward amount to be paid out to each party in system 100 (e.g., 65% of the total reward amount is to be paid out to solver 120 that submitted the correct solution, 35% of the total reward amount is to be paid out between each observer 130 that voted "yes" on the correct solution, etc.).

Figure 4:
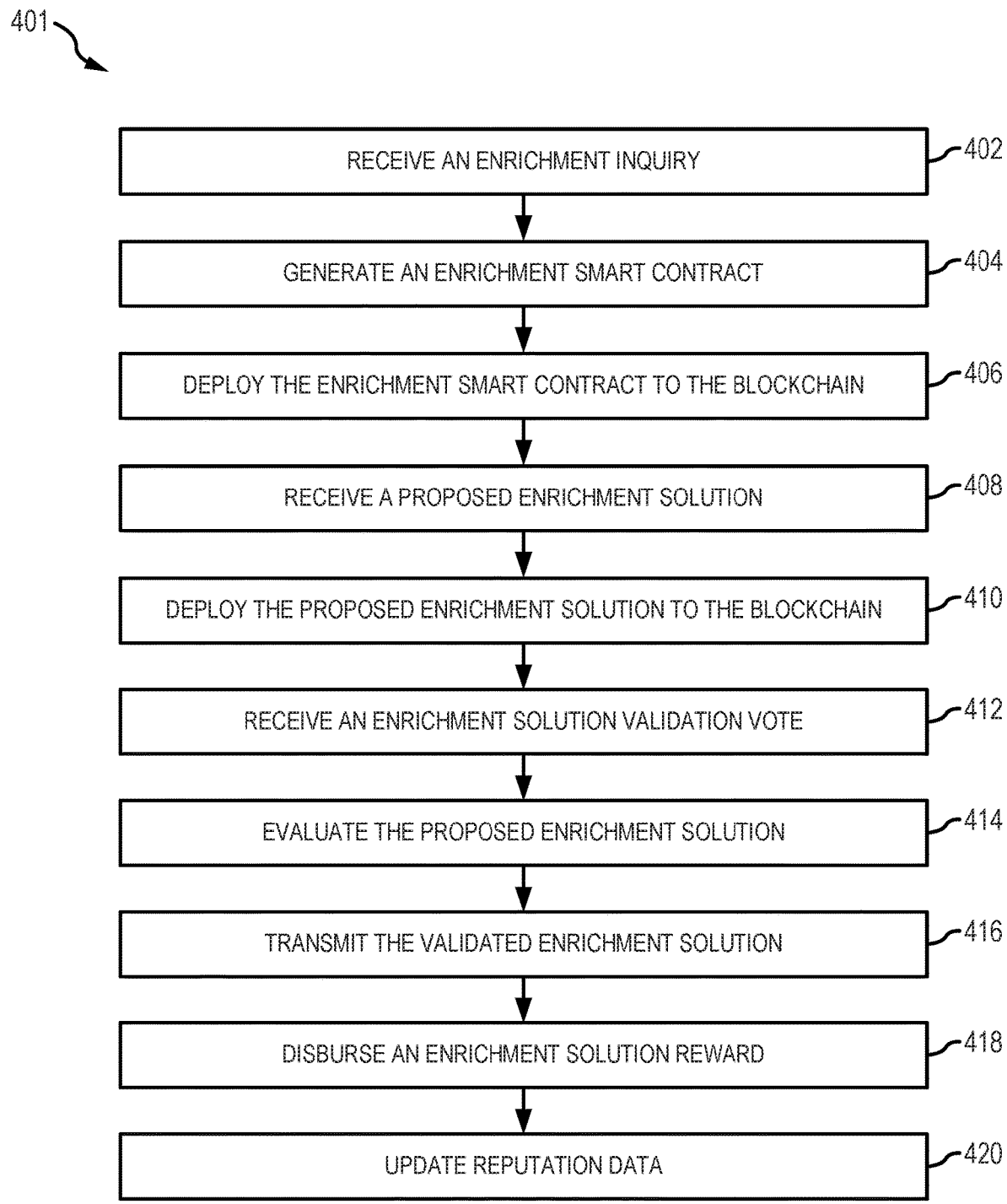
FIG. 4 illustrates a process flow for processing an enrichment inquiry in a data processing environment, in accordance with various embodiments.

Referring now to FIG. 4, the process flows depicted are merely embodiments and are not intended to limit the scope of the disclosure. For example, the steps recited in any of the method or process descriptions may be executed in any order and are not limited to the order presented. It will be appreciated that the following description makes appropriate references not only to the steps depicted in FIG. 4, but also to the various system components as described above with reference to FIGS. 1-3.

In various embodiments, a method 401 of processing an enrichment inquiry in a data processing environment is disclosed. Method 401 may comprise receiving an enrichment inquiry (step 402). Client 110 may be configured to transmit the enrichment inquiry to data enrichment environment 101, via data enrichment interface 240. The enrichment inquiry may comprise information indicating the data that client 110 is seeking to enrich or locate. For example, the enrichment inquiry may comprise vendor details (e.g., business name, address, location, URL, image URL, etc.), request details (e.g., enrichment request, expiration date, etc.), reward details (e.g., a total reward amount, a reward distribution schema, contract conditions, etc.), and/or the like. The total reward amount may comprise a total value to be disbursed in response to a solution being found. In various embodiments, funds matching the total reward amount may be transmitted with the enrichment inquiry. The reward distribution schema may comprise data indicating how the total reward amount is to be paid out in response to the solution being found (e.g., 60% to solver 120 that transmitted the solution; 40% split between each observer 130 that correctly voted for the solution; and/or the like). The contract conditions may comprise details regarding the solution (e.g., only solutions from solvers 120 having a solver reputation of "positive" are accepted, or the like) and voting requirements (e.g., first proposed solution to 50 "yes" votes is selected as the solution; a proposed solution having 90% of the votes as "yes" is selected as the solution; only votes from observers 130 having an observer reputation of "positive" are accepted; and/or the like).

In various embodiments, in response to receiving the enrichment inquiry, data enrichment interface 240 may be configured to query blockchain 260 to determine whether the requested data (e.g., the enrichment request) preexists in blockchain 260. In response to locating the requested data, data enrichment interface 240 may return the located data to resolve the user's enrichment inquiry. In that respect, previously resolved enrichment smart contracts may be accessed by users to solve the user's current data enrichment request, and a new enrichment smart contract may not need to be deployed to the blockchain. In response to being unable to locate the requested data, data enrichment interface 240 may continue to step 404.

Method 401 may comprise generating an enrichment smart contract (step 404). Data enrichment interface 240, via smart contract generation module 341, may be configured to generate the enrichment smart contract 250 to comprise a client ID (e.g., the blockchain address of client 110), the enrichment inquiry, and/or an inquiry ID. The inquiry ID may comprise a randomly generated number assigned to each enrichment smart contract 250. Method 401 may comprise deploying the enrichment smart contract to the blockchain (step 406). In various embodiments, data enrichment interface 240, via smart contract generation module 341, may write the enrichment smart contract 250 to blockchain 260. In various embodiments wherein client 110 comprises a node of blockchain 260, client 110 may directly deploy the enrichment smart contract 250 to blockchain 260.

Method 401 may comprise receiving a proposed enrichment solution (step 408). Solver 120 may be configured to query blockchain 260, via data enrichment interface 240, to retrieve one or more enrichment smart contracts 250 and/or to view the requested enrichment inquiry. For example, and in accordance with various embodiments, solver 120 may implement an API to monitor blockchain 260 to retrieve enrichment smart contracts 250. In various embodiments, solver 120 may also query blockchain 260 to search for enrichment smart contracts 250. In response to determining that solver 120 contains the solution for the enrichment inquiry, solver 120 may transmit the proposed enrichment solution to data enrichment interface 240. The proposed enrichment solution may comprise data indicating a proposed solution to the enrichment inquiry. For example, wherein the enrichment inquiry is a request for a photograph of a merchant's location, the proposed enrichment solution may comprise a photograph of the merchant's location, a URL link to a photograph of the merchant's location, or the like. Wherein the enrichment inquiry comprises data asking to verify a vendor detail (e.g., verify a business's address), the proposed enrichment solution may comprise data verifying the vendor detail or data indicating that the vendor detail as inquired is incorrect. The proposed enrichment solution may comprise a solver ID (e.g., the blockchain address of solver 120), vendor details (e.g., business name, address, location, URL, image URL, etc.), solution details (e.g., the inquiry ID, the proposed solution corresponding to the enrichment request in the enrichment smart contract 250, etc.), and a solution ID. The solution ID may comprise a randomly generated number assigned to each proposed enrichment solution.

Method 401 may comprise deploying the proposed enrichment solution to the blockchain (step 410). In various embodiments, data enrichment interface 240 may write the proposed enrichment solution to blockchain 260. In various embodiments wherein solver 120 comprises a node of blockchain 260, solver 120 may directly deploy the proposed enrichment solution to blockchain 260. The proposed enrichment solution may be digitally signed by the private key of the solver 120 prior to being deployed to blockchain 260.

Method 401 may comprise receiving an enrichment solution validation vote (step 412). Observer 130 may be configured to query blockchain 260, via data enrichment interface 240 to retrieve one or more proposed enrichment solutions. For example, and in accordance with various embodiments, observer 130 may implement an API to monitor blockchain 260 to retrieve proposed enrichment solutions. In various embodiments, observer 130 may also query blockchain 260 to search for proposed enrichment solutions. In response to determining that observer 130 can verify that the proposed solution is correct, observer 130 may transmit the enrichment solution validation vote to voting module 343 of data enrichment interface 240. The enrichment solution validation vote may comprise data (e.g., a vote) indicating whether the proposed enrichment solution is accurate.

For example, and in accordance with various embodiments, the enrichment solution validation vote may comprise data (e.g., the vote) based on a scale of 1-100 wherein a vote between 1-50 indicates a negative vote, and a vote between 51-100 indicates a positive vote. In that respect, each vote may comprise a confidence level in addition to the vote (e.g., a vote of 1 indicates a high level of confidence in the negative vote whereas a vote of 49 indicates a low level of confidence in the negative vote, and a vote of 99 indicates a high level of confidence in the positive vote whereas a vote of 51 indicates a low level of confidence in the positive vote). As a further example, and in accordance with various embodiments, the enrichment solution validation vote may comprise data (e.g., the vote) indicating a "yes" or "no" value, and/or any other suitable identifier. The enrichment solution validation vote may comprise the vote, an observer ID (e.g., the blockchain address of observer 130), the solution ID, and/or the like.

In various embodiments, each enrichment solution validation vote may be deployed to blockchain 260. For example, and in accordance with various embodiments, data enrichment interface 240, via voting module 343, may write the enrichment solution validation vote to blockchain 260. In various embodiments wherein observer 130 comprises a node of blockchain 260, observer 130 may directly deploy the enrichment solution validation vote to blockchain 260. The enrichment solution validation vote may be digitally signed by the private key of observer 130 prior to being deployed to blockchain 260.

Method 401 may comprise evaluating the proposed enrichment solution (step 414). Data enrichment interface 240, via evaluation module 345, may be configured to evaluate the proposed enrichment solution based on the contract conditions from the enrichment inquiry. For example, the contract conditions may specify that a desired number of positive enrichment solution validation votes are received, that each observer voting on the solution have a minimum observer reputation (e.g., 60% positive), that the solver originating the solution have a minimum solver reputation (e.g., 70% positive) or that the solver originating the solution corresponds to a predetermined solver ID (e.g., the proposed solution comes from a known party), and/or any other suitable limitation. In response to determining that a proposed enrichment solution is correct (e.g., passes the evaluation and meets the criteria specified in the contract conditions), evaluation module 345 may generate a validated enrichment.

Method 401 may comprise transmitting the validated enrichment solution (step 416). Data enrichment interface 240, via evaluation module 345, may transmit the validated enrichment solution to client 110. Data enrichment interface 240, via evaluation module 345, may also be configured to deploy the validated enrichment solution to blockchain 260. For example, and in accordance with various embodiments, data enrichment interface 240, via evaluation module 345, may write the validated enrichment solution to blockchain 260. In that respect, client 110 may also query blockchain 260 to retrieve the validated enrichment solution.

Method 401 may comprise disbursing an enrichment solution reward (step 418). For example, the enrichment solution reward may comprise the reward to be paid out to each party responsible for determining the correct solution to the enrichment inquiry. The enrichment solution reward may be based on the total reward amount and the contract conditions specified in the enrichment inquiry. Data enrichment interface 240, via disbursement module 347, may be configured to disburse the enrichment solution reward to each party. For example, the contract conditions may specify the portions of the total reward amount to be paid out to each party in system 100 (e.g., 55% of the total reward amount is to be paid out to solver 120 that submitted the correct solution, 45% of the total reward amount is to be paid out between each observer 130 that voted "yes" on the correct solution, etc.).

Method 401 may comprise updating reputation data (step 420). Data enrichment interface 240 may be configured to update observer reputation data and solver reputation data for each solver 120 and/or observer 130 that interacted with data enrichment environment 101 during the enrichment inquiry. For example, data enrichment interface 240 may query blockchain 260 to retrieve solver reputation data based on the solver ID (e.g., blockchain address) of each solver 120 that submitted a proposed enrichment solution. The solver reputation data may comprise reputation details regarding each solver 120, such as the solver ID, the total count solutions proposed, the count positive (e.g., proposed solutions that comprised more positive votes than negative votes), the count validated solutions (e.g., winning proposed solutions), the count negative (e.g., proposed solutions that comprised more negative votes than positive votes), the count failed solutions (e.g., failed proposed solutions), and/or the like. Data enrichment interface 240 may update the solver reputation data by writing a new block with updated reputation details to blockchain 260 corresponding each solver 120.

For example, data enrichment interface 240 may query blockchain 260 to retrieve observer reputation data based on the observer ID for each observer 130 that voted on any enrichment solution. The observer reputation data may comprise reputation details regarding each observer 130, such as the observer ID, the total count voted on, the count positive (e.g., voted yes), the count positive agreeing with the majority, the count negative (e.g., voted no), the count negative agreeing with the majority, and/or the like. Data enrichment interface 240 may update the observer reputation data by writing a new block with updated reputation details to blockchain 260 corresponding each observer 130.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "satisfy", "meet", "match", "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

Terms and phrases similar to "associate" and/or "associating" may include tagging, flagging, correlating, using a look-up table or any other method or system for indicating or creating a relationship between elements, such as, for example, (i) a transaction account and (ii) an item (e.g., offer, reward, discount) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input and/or any other method known in the art.

A distributed computing cluster and/or big data management system may be, for example, a Hadoop® cluster configured to process and store big data sets with some of nodes comprising a distributed storage system and some of nodes comprising a distributed processing system. In that regard, distributed computing cluster may be configured to support a Hadoop® distributed file system (HDFS) as specified by the Apache Software Foundation at http://hadoop.apache.org/docs/. For more information on big data management systems, see U.S. Ser. No. 14/944,902 titled INTEGRATED BIG DATA INTERFACE FOR MULTIPLE STORAGE TYPES and filed on Nov. 18, 2015; U.S. Ser. No. 14/944,979 titled SYSTEM AND METHOD FOR READING AND WRITING TO BIG DATA STORAGE FORMATS and filed on Nov. 18, 2015; U.S. Ser. No. 14/945,032 titled SYSTEM AND METHOD FOR CREATING, TRACKING, AND MAINTAINING BIG DATA USE CASES and filed on Nov. 18, 2015; U.S. Ser. No. 14/944,849 titled SYSTEM AND METHOD FOR AUTOMATICALLY CAPTURING AND RECORDING LINEAGE DATA FOR BIG DATA RECORDS and filed on Nov. 18, 2015; U.S. Ser. No. 14/944,898 titled SYSTEMS AND METHODS FOR TRACKING SENSITIVE DATA IN A BIG DATA ENVIRONMENT and filed on Nov. 18, 2015; and U.S. Ser. No. 14/944,961 titled SYSTEM AND METHOD TRANSFORMING SOURCE DATA INTO OUTPUT DATA IN BIG DATA ENVIRONMENTS and filed on Nov. 18, 2015, the contents of each of which are herein incorporated by reference in their entirety.

Any communication, transmission and/or channel discussed herein may include any system or method for delivering content (e.g. data, messages, information, metadata, etc.), and/or the content itself. The content may be presented in any form or medium, and in various embodiments, the content may be delivered electronically and/or capable of being presented electronically. For example, a channel may comprise a website or device (e.g., FACEBOOK®, YOU- TUBE®, APPLE®TV®, PANDORA®, XBOX®, SONY® PLAYSTATION®), a uniform resource locator ("URL"), a document (e.g., a MICROSOFT® Word® document, a MICROSOFT® Excel® document, an ADOBE® .pdf document, etc.), an "ebook," an "emagazine," an application or microapplication (as described herein), an SMS or other type of text message, an email, FACEBOOK® message, TWITTER® tweet and/or message, MMS, and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, MYSPACE®, LINKEDIN®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; business and/or merchant data; financial institution data; and/or like data useful in the operation of the system. As those skilled in the art will appreciate, user computer may include an operating system (e.g., WINDOWS®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations or any of the operations may be conducted or enhanced by Artificial Intelligence (AI) or Machine Learning. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a magnetic tape drive, an optical disk drive, etc. The removable storage drive reads from and/or writes to a removable storage unit in a well-known manner. Removable storage unit represents a magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data files transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The computer system or any components may integrate with system integration technology such as, for example, the ALEXA system developed by AMAZON®. ALEXA is a cloud-based voice service that can help you with tasks, entertainment, general information and more. All AMAZON® ALEXA devices, such as the AMAZON ECHO®, AMAZON ECHO DOT®, AMAZON TAP®, and AMAZON FIRE® TV, have access to the ALEXA system. The ALEXA system may receive voice commands via its voice activation technology, and activate other functions, control smart devices and/or gather information. For example, music, emails, texts, calling, questions answered, home improvement information, smart home communication/activation, games, shopping, making to-do lists, setting alarms, streaming podcasts, playing audiobooks, and providing weather, traffic, and other real time information, such as news. The ALEXA system may allow the user to access information about eligible accounts linked to an online account across all ALEXA-enabled devices.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the server may include application servers (e.g. WEBSPHERE®, WEBLOGIC®, JBOSS®, EDB® Postgres Plus Advanced Server® (PPAS), etc.). In various embodiments, the server may include web servers (e.g. APACHE®, IIS, GWS, SUN JAVA® SYSTEM WEB SERVER, JAVA® Virtual Machine running on LINUX® or WINDOWS®).

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MACBOOKS®, kiosks, terminals, point of sale (POS) devices and/or terminals, televisions, or any other device capable of receiving data over a network. A web-client may run MICROSOFT® INTERNET EXPLORER®, MOZILLA® FIREFOX®, GOOGLE® CHROME®, APPLE® Safari, or any other of the myriad software packages available for browsing the internet.

As those skilled in the art will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In various embodiments, access is through a network or the Internet through a commercially-available web-browser software package.

As those skilled in the art will appreciate, a web client includes an operating system (e.g., WINDOWS® OS, OS2, UNIX® OS, LINUX® OS, SOLARIS®, MacOS, and/or the like) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In various embodiments, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In various embodiments, components, modules, and/or engines of system 100 may be implemented as micro-applications or micro-apps. Micro-apps are typically deployed in the context of a mobile operating system, including for example, a WINDOWS® mobile operating system, an ANDROID® Operating System, APPLE® IOSC), a BLACKBERRY® operating system, and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and communicates a detected input from the hardware to the micro-app.

Any databases discussed herein may include relational, hierarchical, graphical, blockchain, object-oriented structure, and/or any other database configurations. The databases may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2 by IBM® (Armonk, N.Y.), various database products available from ORACLE® Corporation (Redwood Shores, Calif.), MICROSOFT® ACCESS® or MICROSOFT® SQL Server® by MICROSOFT® Corporation (Redmond, Wash.), MYSQL® by MySQL AB (Uppsala, Sweden), HBase by APACHE®, MapR-DB, or any other suitable database product. Moreover, the databases may be organized in any suitable manner, for example, as data tables or lookup tables. Each record may be a single file, a series of files, a linked series of data fields. or any other data structure.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set: e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a standalone interaction device configured to add, delete, modify, or augment the data in accordance with the header or trailer. As such, in one embodiment, the header or trailer is not stored on the transaction device along with the associated issuer-owned data but instead the appropriate action may be taken by providing to the user at the standalone device, the appropriate option for the action to be taken. The system may contemplate a data storage arrangement wherein the header or trailer, or header or trailer history, of the data is stored on the system, device, or transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PM, GPG (GnuPG), HPE Format-Preserving Encryption (FPE), Voltage, and symmetric and asymmetric cryptosystems. The systems and methods may also incorporate SHA series cryptographic methods as well as ECC (Elliptic Curve Cryptography) and other Quantum Readable Cryptography Algorithms under development.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within a web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the MICROSOFT® INTERNET INFORMATION SERVICES® (IIS), MICROSOFT® Transaction Server (MTS), and MICROSOFT® SQL Server, are used in conjunction with the MICROSOFT® operating system, MICROSOFT® web server software, a MICROSOFT® SQL Server database system, and a MICROSOFT® Commerce Server. Additionally, components such as MICROSOFT® ACCESS® or MICROSOFT® SQL Server, ORACLE®, SYBASE®, INFORMIX® MySQL, INTERBASE®, etc., may be used to provide an Active Data Object (ADO) compliant database management system. In one embodiment, the Apache web server is used in conjunction with a Linux operating system, a MYSQL® database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT®, active server pages (ASP), common gateway interface scripts (CGI), extensible markup language (XML), dynamic HTML, cascading style sheets (CSS), AJAX (Asynchronous JAVASCRIPT® And XML), helper applications, plug-ins, and the like. A server may include a web service that receives a request from a web server, the request including a URL and an IP address (e.g., 10.0.0.2). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. For example, representational state transfer (REST), or RESTful, web services may provide one way of enabling interoperability between applications.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WEBSPHERE® MQTM (formerly MQSeries) by IBM®, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, APACHE® Hive, JAVA®, JAVASCRIPT®, VBScript, Macromedia Cold Fusion, COBOL, MICROSOFT® Active Server Pages, assembly, PERL, PHP, awk, Python, Visual Basic, SQL Stored Procedures, Spark, Scala, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT®, VBScript or the like. Cryptography and network security methods are well known in the art, and are covered in many standard texts.

In various embodiments, the software elements of the system may also be implemented using Node.js®. Node.js® may implement several modules to handle various core functionalities. For example, a package management module, such as Npm®, may be implemented as an open source library to aid in organizing the installation and management of third-party Node.js® programs. Node.js® may also implement a process manager, such as, for example, Parallel Multithreaded Machine ("PM2"); a resource and performance monitoring tool, such as, for example, Node Application Metrics ("appmetrics"); a library module for building user interfaces, such as for example ReachJS®; and/or any other suitable and/or desired module.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, BLU-RAY, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

Referring now to FIG. 4, the process flows depicted are merely embodiments and are not intended to limit the scope of the disclosure. For example, the steps recited in any of the method or process descriptions may be executed in any order and are not limited to the order presented.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS' but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

The disclosure and claims do not describe only a particular outcome of enriching data using a data enrichment environment, but the disclosure and claims include specific rules for implementing the outcome of enriching data using a data enrichment environment and that render information into a specific format that is then used and applied to create the desired results of enriching data using a data enrichment environment, as set forth in *McRO, Inc.* v. *Bandai Namco Games America Inc.* (Fed. Cir. case number 15-1080, Sep. 13, 2016). In other words, the outcome of enriching data using a data enrichment environment can be performed by many different types of rules and combinations of rules, and this disclosure includes various embodiments with specific rules. While the absence of complete preemption may not guarantee that a claim is eligible, the disclosure does not sufficiently preempt the field of enriching data using a data enrichment environment at all. The disclosure acts to narrow, confine, and otherwise tie down the disclosure so as not to cover the general abstract idea of just enriching data using a data enrichment environment. Significantly, other systems and methods exist for enriching data using a data enrichment environment, so it would be inappropriate to assert that the claimed invention preempts the field or monopolizes the basic tools of enriching data using a data enrichment environment. In other words, the disclosure will not prevent others from enriching data, because other systems are already performing the functionality in different ways than the claimed invention. Moreover, the claimed invention includes an inventive concept that may be found in the non-conventional and non-generic arrangement of known, conventional pieces, in conformance with *Bascom* v. *AT&T Mobility,* 2015-1763 (Fed. Cir. 2016). The disclosure and claims go way beyond any conventionality of any one of the systems in that the interaction and synergy of the systems leads to additional functionality that is not provided by any one of the systems operating independently. The disclosure and claims may also include the interaction between multiple different systems, so the disclosure cannot be considered an implementation of a generic computer, or just "apply it" to an abstract process. The disclosure and claims may also be directed to improvements to software with a specific implementation of a solution to a problem in the software arts.

In various embodiments, the system and method may include a graphical user interface (e.g., via data enrichment interface 240) for dynamically relocating/rescaling obscured textual information of an underlying window to become automatically viewable to the user. By permitting textual information to be dynamically relocated based on an overlap condition, the computer's ability to display information is improved. More particularly, the method for dynamically relocating textual information within an underlying window displayed in a graphical user interface may comprise displaying a first window containing textual information in a first format within a graphical user interface on a computer screen; displaying a second window within the graphical user interface; constantly monitoring the boundaries of the first window and the second window to detect an overlap condition where the second window overlaps the first window such that the textual information in the first window is obscured from a user's view; determining the textual information would not be completely viewable if relocated to an unobstructed portion of the first window; calculating a first measure of the area of the first window and a second measure of the area of the unobstructed portion of the first window; calculating a scaling factor which is proportional to the difference between the first measure and the second measure; scaling the textual information based upon the scaling factor; automatically relocating the scaled textual information, by a processor, to the unobscured portion of the first window in a second format during an overlap condition so that the entire scaled textual information is viewable on the computer screen by the user; and automatically returning the relocated scaled textual information, by the processor, to the first format within the first window when the overlap condition no longer exists.

In various embodiments, the system may also include isolating and removing malicious code from electronic messages (e.g., from data enrichment inquiries, proposed enrichment solutions, validated enrichment solutions, etc.) to prevent a computer from being compromised, for example by being infected with a computer virus. The system may scan electronic communications for malicious computer code and clean the electronic communication before it may initiate malicious acts. The system operates by physically isolating a received electronic communication in a "quarantine" sector of the computer memory. A quarantine sector is a memory sector created by the computer's operating system such that files stored in that sector are not permitted to act on files outside that sector. When a communication containing malicious code is stored in the quarantine sector, the data contained within the communication is compared to malicious code-indicative patterns stored within a signature database. The presence of a particular malicious code-indicative pattern indicates the nature of the malicious code. The signature database further includes code markers that represent the beginning and end points of the malicious code. The malicious code is then extracted from malicious code-containing communication. An extraction routine is run by a file parsing component of the processing unit. The file parsing routine performs the following operations: scan the communication for the identified beginning malicious code marker; flag each scanned byte between the beginning marker and the successive end malicious code marker; continue scanning until no further beginning malicious code marker is found; and create a new data file by sequentially copying all non-flagged data bytes into the new file, which forms a sanitized communication file. The new, sanitized communication is transferred to a non-quarantine sector of the computer memory. Subsequently, all data on the quarantine sector is erased. More particularly, the system includes a method for protecting a computer from an electronic communication containing malicious code by receiving an electronic communication containing malicious code in a computer with a memory having a boot sector, a quarantine sector and a non-quarantine sector; storing the communication in the quarantine sector of the memory of the computer, wherein the quarantine sector is isolated from the boot and the non-quarantine sector in the computer memory, where code in the quarantine sector is prevented from performing write actions on other memory sectors; extracting, via file parsing, the malicious code from the electronic communication to create a sanitized electronic communication, wherein the extracting comprises scanning the communication for an identified beginning malicious code marker, flagging each scanned byte between the beginning marker and a successive end malicious code marker, continuing scanning until no further beginning malicious code marker is found, and creating a new data file by sequentially copying all non-flagged data bytes into a new file that forms a sanitized communication file; transferring the sanitized electronic communication to the non-quarantine sector of the memory; and deleting all data remaining in the quarantine sector.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims.

Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:
   receiving, by a computing device in electronic communication with a blockchain, an enrichment inquiry comprising a first vendor detail and an enrichment request detail;
   querying, by the computing device, the blockchain to determine whether the first vendor detail and the enrichment request detail preexists;
   in response to determining that the first vendor detail and the enrichment request detail preexists, generating, by the computing device in electronic communication with the blockchain, a request solution comprising preexisting data corresponding to the first vendor detail and the enrichment request detail;
   in response to determining that the first vendor detail and the enrichment request detail do not preexist, generating, by the computing device in electronic communication with the blockchain, an enrichment smart contract comprising a client ID, an inquiry ID, the first vendor detail, the enrichment request detail, and a contract condition;
   deploying, by the computing device, the enrichment smart contract to the blockchain;
   receiving, by the computing device, a proposed enrichment solution comprising a solver ID, a solution ID, the inquiry ID, a second vendor detail, and an enrichment solution detail corresponding to the enrichment request detail; and
   evaluating, by the computing device, the proposed enrichment solution based on the contract condition, the first vendor detail, and the second vendor detail, wherein in response to the proposed enrichment solution passing the evaluation, a validated enrichment solution is generated.

2. The method of claim 1, further comprising receiving, by the computing device, an enrichment solution validation vote corresponding to the proposed enrichment solution, the enrichment solution validation vote comprising an observer ID, the solution ID, the inquiry ID, and a vote, wherein the proposed enrichment solution is validated based on the vote.

3. The method of claim 1, further comprising:
   receiving, by the computing device, an enrichment inquiry comprising a third vendor detail and a request detail; and
   querying, by the computing device, the blockchain to determine whether the third vendor detail and the request detail preexists, wherein in response to determining that the third vendor detail and the request detail preexists, a request solution is generated comprising the preexisting data corresponding to the third vendor detail and the request detail, and wherein in response to determining that the third vendor detail and the request detail do not preexist, a second enrichment contract is generated comprising the third vendor detail and the request detail.

4. The method of claim 1, wherein the enrichment smart contract comprises a total reward amount and a reward distribution schema.

5. The method of claim 4, further comprising:
   receiving, by the computing device, an enrichment solution validation vote corresponding to the proposed enrichment solution, the enrichment solution validation vote comprising an observer ID, the solution ID, the inquiry ID, and a vote, wherein the proposed enrichment solution is validated based on the vote; and
   disbursing, by the computing device, the total reward amount to at least one of the solver ID or the observer ID based on the reward distribution schema.

6. The method of claim 1, further comprising updating, by the computing device, solver reputation data based on the evaluation of the proposed enrichment solution, wherein the solver reputation data corresponds to the solver ID and comprises at least one of a total count of solutions proposed, a count of positive solutions, a count of validated solutions, a count of negative solutions, or a count of failed solutions.

7. The method of claim 1, further comprising:
   receiving, by the computing device, an enrichment solution validation vote corresponding to the proposed enrichment solution, the enrichment solution validation vote comprising an observer ID, the solution ID, the inquiry ID, and a vote, wherein the proposed enrichment solution is validated based on the vote; and
   updating, by the computing device, observer reputation data based on the evaluation of the proposed enrichment solution, wherein the observer reputation data corresponds to the observer ID and comprises at least one of a total count voted on, a count of positive votes, a count of positive votes agreeing with a majority, a count of negative votes, or a count of negative votes agreeing with the majority.

8. A computer-based system for data enrichment, comprising:
   a processor;
   a tangible, non-transitory memory configured to communicate with the processor, the tangible, non-transitory memory having instructions stored thereon that, in response to execution by the processor, cause the processor to perform operations comprising:
      receiving an enrichment inquiry comprising a first vendor detail and an enrichment request detail;
      querying a blockchain to determine whether the first vendor detail and the enrichment request detail preexists;
      in response to determining that the first vendor detail and the enrichment request detail preexists, generating a request solution comprising preexisting data corresponding to the first vendor detail and the enrichment request detail;
      in response to determining that the first vendor detail and the enrichment request detail do not preexist, generating an enrichment smart contract comprising a client ID, an inquiry ID, the first vendor detail, the enrichment request detail, and a contract condition;
      deploying the enrichment smart contract to the blockchain;
      receiving a proposed enrichment solution comprising a solver ID, a solution ID, the inquiry ID, a second vendor detail, and an enrichment solution detail corresponding to the enrichment request detail; and
      evaluating the proposed enrichment solution based on the contract condition, the first vendor detail, and the second vendor detail, wherein in response to the proposed enrichment solution passing the evaluation, a validated enrichment solution is generated.

9. The system of claim 8, wherein the operations further comprise receiving an enrichment solution validation vote corresponding to the proposed enrichment solution, the enrichment solution validation vote comprising an observer ID, the solution ID, the inquiry ID, and a vote, wherein the proposed enrichment solution is validated based on the vote.

10. The system of claim 8, wherein the operations further comprise:
receiving an enrichment inquiry comprising a third vendor detail and a request detail; and
querying a blockchain to determine whether the third vendor detail and the request detail preexists, wherein in response to determining that the third vendor detail and the request detail preexists a request solution is generated comprising preexisting data corresponding to the third vendor detail and the request detail, and wherein in response to determining that the third vendor detail and the request detail do not preexist a second enrichment contract is generated comprising the third vendor detail and the request detail.

11. The system of claim 8, wherein the enrichment smart contract comprises a total reward amount and a reward distribution schema.

12. The system of claim 11, wherein the operations further comprise:
receiving an enrichment solution validation vote corresponding to the proposed enrichment solution, the enrichment solution validation vote comprising an observer ID, the solution ID, the inquiry ID, and a vote, wherein the proposed enrichment solution is validated based on the vote; and
disbursing the total reward amount to at least one of the solver ID or the observer ID based on the reward distribution schema.

13. The system of claim 8, wherein the operations further comprise updating solver reputation data based on the evaluation of the proposed enrichment solution, wherein the solver reputation data corresponds to the solver ID and comprises at least one of a total count of solutions proposed, a count of positive solutions, a count of validated solutions, a count of negative solutions, or a count of failed solutions.

14. The system of claim 8, wherein the operations further comprise:
receiving an enrichment solution validation vote corresponding to the proposed enrichment solution, the enrichment solution validation vote comprising an observer ID, the solution ID, the inquiry ID, and a vote, wherein the proposed enrichment solution is validated based on the vote; and
updating observer reputation data based on the evaluation of the proposed enrichment solution, wherein the observer reputation data corresponds to the observer ID and comprises at least one of a total count voted on, a count of positive votes, a count of positive votes agreeing with a majority, a count of negative votes, or a count of negative votes agreeing with the majority.

15. An article of manufacture including a non-transitory, tangible computer readable storage medium having instructions stored thereon that, in response to execution by a computer based system, cause the computer based system to perform operations comprising:
receiving an enrichment inquiry comprising a first vendor detail and an enrichment request detail;
querying a blockchain to determine whether the first vendor detail and the enrichment request detail preexists;
in response to determining that the first vendor detail and the enrichment request detail preexists, generating a request solution comprising preexisting data corresponding to the first vendor detail and the enrichment request detail;
in response to determining that the first vendor detail and the enrichment request detail do not preexist, generating an enrichment smart contract comprising a client ID, an inquiry ID, the first vendor detail, the enrichment request detail, and a contract condition;
deploying the enrichment smart contract to the blockchain;
receiving a proposed enrichment solution comprising a solver ID, a solution ID, the inquiry ID, a second vendor detail, and an enrichment solution detail corresponding to the enrichment request detail; and
evaluating the proposed enrichment solution based on the contract condition, the first vendor detail, and the second vendor detail, wherein in response to the proposed enrichment solution passing the evaluation, a validated enrichment solution is generated.

16. The article of manufacture of claim 15, wherein the operations further comprise receiving an enrichment solution validation vote corresponding to the proposed enrichment solution, the enrichment solution validation vote comprising an observer ID, the solution ID, the inquiry ID, and a vote, wherein the proposed enrichment solution is validated based on the vote.

17. The article of manufacture of claim 15, wherein the operations further comprise:
receiving an enrichment inquiry comprising a third vendor detail and a request detail; and
querying the blockchain to determine whether the third vendor detail and the request detail preexists, wherein in response to determining that the third vendor detail and the request detail preexists, a request solution is generated comprising preexisting data corresponding to the third vendor detail and the request detail, and wherein in response to determining that the third vendor detail and the request detail do not preexist, a second enrichment contract is generated comprising the third vendor detail and the request detail.

18. The article of manufacture of claim 15, wherein the operations comprise receiving an enrichment solution validation vote corresponding to the proposed enrichment solution, the enrichment solution validation vote comprising an observer ID, the solution ID, the inquiry ID, and a vote, wherein the proposed enrichment solution is validated based on the vote, wherein the enrichment smart contract comprises a total reward amount and a reward distribution schema, and wherein the total reward amount is disbursed to at least one of the solver ID or the observer ID based on the reward distribution schema.

19. The article of manufacture of claim 15, wherein the operations further comprise updating solver reputation data based on the evaluation of the proposed enrichment solution, wherein the solver reputation data corresponds to the solver ID and comprises at least one of a total count of solutions proposed, a count of positive solutions, a count of validated solutions, a count of negative solutions, or a count of failed solutions.

20. The article of manufacture of claim 15, wherein the operations further comprise:
receiving an enrichment solution validation vote corresponding to the proposed enrichment solution, the enrichment solution validation vote comprising an observer ID, the solution ID, the inquiry ID, and a vote, wherein the proposed enrichment solution is validated based on the vote; and updating observer reputation data based on the evaluation of the proposed enrichment solution, wherein the observer reputation data corresponds to the observer ID and comprises at least one of a total count voted on, a count of positive votes, a count of positive votes agreeing with a majority, a count of negative votes, or a count of negative votes agreeing with the majority.

* * * * *